(12) United States Patent
Synnestvedt et al.

(10) Patent No.: US 7,590,740 B1
(45) Date of Patent: Sep. 15, 2009

(54) EXPEDITING PORT RELEASE IN DISTRIBUTED NETWORKS

(75) Inventors: Robert G. Synnestvedt, Palo Alto, CA (US); Sunil B. Mehta, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 778 days.

(21) Appl. No.: 10/104,820

(22) Filed: Mar. 22, 2002

(51) Int. Cl.
*G06F 15/16* (2006.01)

(52) U.S. Cl. ..................................... 709/227

(58) Field of Classification Search ................ 709/227, 709/200, 217, 225; 370/352, 235, 356, 252, 370/458; 379/88.22, 93.08, 269; 713/200; 710/36
See application file for complete search history.

(56) References Cited

U.S. PATENT DOCUMENTS

| | | | |
|---|---|---|---|
| 4,694,487 A * | 9/1987 | Chang et al. ................ 379/269 |
| 5,838,937 A * | 11/1998 | Lee et al. ..................... 710/316 |
| 6,108,306 A * | 8/2000 | Kalkunte et al. ............. 370/235 |
| 6,151,688 A | 11/2000 | Wipfel et al. ................. 714/48 |
| 6,185,288 B1 | 2/2001 | Wong ........................... 379/219 |
| 6,262,984 B1 * | 7/2001 | Rochberger ............... 370/395.2 |
| 6,279,054 B1 * | 8/2001 | Boyle .......................... 710/36 |
| 6,324,264 B1 * | 11/2001 | Wiener et al. ............. 379/88.22 |
| 6,363,065 B1 | 3/2002 | Thornton et al. ............ 370/352 |
| 6,370,151 B1 * | 4/2002 | Bojanic ...................... 370/426 |
| 6,411,601 B1 | 6/2002 | Shaffer et al. |
| 6,411,630 B1 * | 6/2002 | Lallukka et al. ............. 370/458 |
| 6,490,273 B1 * | 12/2002 | DeNap et al. ................ 370/352 |
| 6,490,344 B1 * | 12/2002 | Murai et al. ............. 379/93.08 |
| 6,513,060 B1 * | 1/2003 | Nixon et al. ................. 709/203 |
| 6,556,659 B1 | 4/2003 | Bowman-Amuah |
| 6,584,093 B1 | 6/2003 | Salama et al. ............... 370/351 |
| 6,584,529 B1 | 6/2003 | Thomas ...................... 710/240 |
| 6,625,645 B1 * | 9/2003 | Van Horne et al. ........... 709/221 |
| 6,625,651 B1 * | 9/2003 | Swartz et al. ............... 709/226 |
| 6,629,149 B1 | 9/2003 | Fraser et al. |
| 6,654,366 B1 * | 11/2003 | Ketcham ..................... 370/352 |
| 6,665,714 B1 | 12/2003 | Blumenau et al. |
| 6,714,515 B1 | 3/2004 | Marchand .................... 370/231 |
| 6,754,709 B1 * | 6/2004 | Gbadegesin ................. 709/227 |
| 6,765,903 B1 * | 7/2004 | Allen et al. .................. 370/356 |
| 6,798,771 B1 | 9/2004 | Low et al. .................... 370/353 |
| 6,798,786 B1 | 9/2004 | Lo et al. |
| 6,856,676 B1 | 2/2005 | Pirot et al. |

(Continued)

OTHER PUBLICATIONS

Khalil et al., Implementation of a Bandwidth Broker for Dynamic End-to-End Resource Reservation in Outsourced Virtual Private Network, Local Computer Networks, 2000, LCN 2000, Proceedings, 25th Annual IEEE Conference, Nov. 8-10, 2000, pp. 511-519.

*Primary Examiner*—Andrew Caldwell
*Assistant Examiner*—Benjamin Ailes
(74) *Attorney, Agent, or Firm*—Marger Johnson & McCollom, P.C.

(57) ABSTRACT

A method and device to expedite port release. The method includes receiving a call setup request for a port and then determining the current state of the port. If the current state of the port is active, a release message is transmitted to an entity occupying the port. In an embodiment, the call setup request is granted. In another embodiment, an active port cache is updated to reflect the new entity occupying the port.

16 Claims, 2 Drawing Sheets

U.S. PATENT DOCUMENTS

| | | | |
|---|---|---|---|
| 6,862,626 B1 * | 3/2005 | Ryu | 709/227 |
| 6,883,033 B2 | 4/2005 | Maruyama et al. | |
| 6,909,711 B1 | 6/2005 | Noguchi | 370/356 |
| 6,961,857 B1 | 11/2005 | Floryanzia | 726/14 |
| 6,980,515 B1 | 12/2005 | Schunk et al. | |
| 6,983,319 B1 * | 1/2006 | Lu et al. | 709/223 |
| 7,075,922 B2 | 7/2006 | Mussman et al. | |
| 7,173,910 B2 | 2/2007 | Goodman | |
| 7,200,110 B1 * | 4/2007 | Burns et al. | 370/225 |
| 7,209,473 B1 | 4/2007 | Mohaban et al. | |
| 7,424,539 B2 * | 9/2008 | Gbadegesin | 709/227 |
| 2001/0047333 A1 | 11/2001 | Kim et al. | 705/40 |
| 2002/0075844 A1 | 6/2002 | Hagen | 370/351 |
| 2002/0078119 A1 | 6/2002 | Brenner et al. | 718/102 |
| 2002/0085569 A1 | 7/2002 | Inoue | 370/401 |
| 2002/0089985 A1 * | 7/2002 | Wahl et al. | 370/395.1 |
| 2002/0091854 A1 | 7/2002 | Smith | |
| 2002/0102999 A1 * | 8/2002 | Maggenti et al. | 455/518 |
| 2002/0103895 A1 * | 8/2002 | Chiang | 709/224 |
| 2002/0107952 A1 * | 8/2002 | Mancusi et al. | 709/223 |
| 2002/0122417 A1 | 9/2002 | Miller et al. | 370/352 |
| 2002/0160811 A1 | 10/2002 | Jannette et al. | |
| 2003/0002476 A1 | 1/2003 | Chung et al. | 370/352 |
| 2003/0051195 A1 * | 3/2003 | Bosa et al. | 714/43 |
| 2003/0065741 A1 * | 4/2003 | Vo | 709/217 |
| 2003/0074576 A1 * | 4/2003 | Kelly | 713/200 |
| 2004/0030752 A1 | 2/2004 | Selgas et al. | 709/206 |

* cited by examiner

EXPEDITING PORT RELEASE IN DISTRIBUTED NETWORKS

CROSS REFERENCE TO RELATED APPLICATIONS

This application is being filed with the related, co-pending applications as set forth below:

U.S. patent application Ser. No. 10/104,817 entitled

"RESOURCE AND AAA SERVICE DEVICE"

filed on Mar. 22, 2002

U.S. patent application Ser. No. 10/104,816 entitled

"VOICE AND DIAL SERVICE LEVEL AGREEMENT ENFORCEMENT ON UNIVERSAL GATEWAY,"

filed on Mar. 22, 2002

U.S. patent application Ser. No. 10/104,819 entitled

"SEGREGATING SERVICE LEVEL AGREEMENTS ACROSS LARGE-SCALE NETWORKS"

filed on Mar. 22, 2002

U.S. patent application Ser. No. 10/104,299 entitled

"SHARING GATEWAY RESOURCES ACROSS MULTI-POP NETWORKS"

filed on Mar. 22, 2002

BACKGROUND

1. Field

This disclosure relates to distributed networks, more particularly to resource management in distributed networks to expedite port release.

2. Background

A distributed network, as the term is used here, typically involves several customers utilizing the same points-of-presence (POP) to access a wholesale dial-up network. For example, wholesaler ABC may own the physical lines and routers and other network equipment, which it then leases to customers 1 through 50. Users that obtain their network service from customer 1 may dial into the same POP as users obtaining their network service from customer 50. Customers may also be referred to as Internet Service Providers (ISP), although the scenarios in which this occurs may not be limited to Internet Protocol (IP) networks.

The distributed aspect of the network lies in the nature of the administration. Having several different customers using the same wholesale network may lead to bottlenecks in tracking, accounting, authorizing and authenticating user for each customer. In some instances, these administrative tasks are distributed across the network and these networks will be referred to as distributed networks.

In distributed networks, sometimes there are delays in providing all of the various administrative devices the updated information. For example, a gateway located in a POP may receive accounting information related to one customer's use of a particular port on the POP. The gateway transmits that information to an administrative server somewhere else in the network, which then records, or posts, the information indicating that the port is busy. At some point, that port is released and the updated information will be transmitted to the same administrative server.

During the period of time between when the port is released and the administrative server records the release, several call requests may be improperly rejected. This delay may increase with any buffering performed in the system. The port may actually be able to accept a new call or calls, but the system has outdated information and therefore rejects the calls that could actually be accepted.

Therefore, it would be useful if some method and device were available that would allow the system to expedite release of the ports without having to wait for a distributed administrative device to be updated.

SUMMARY

An embodiment is a method to expedite port release in a distributed network. A call setup request is received for a port. The current state of the port is determined. If the port is active, then a release message is transmitted to the entity occupying the port. In another embodiment, the call setup request is granted. In another embodiment, an active port cache is updated.

Another embodiment is a network device having an input port, a processor and a store. The device receives a call setup request for a point-of-presence port on the input port. The processor then accesses a store to determine if the point-of-presence port is listed as being active in a list of active ports contained in the store. In one embodiment, the network device then sends a release message to an entity listed as occupying the port in the list of active ports. In yet another embodiment, the processor updates the list of active ports to reflect the entity that generated the call setup request as occupying the port.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
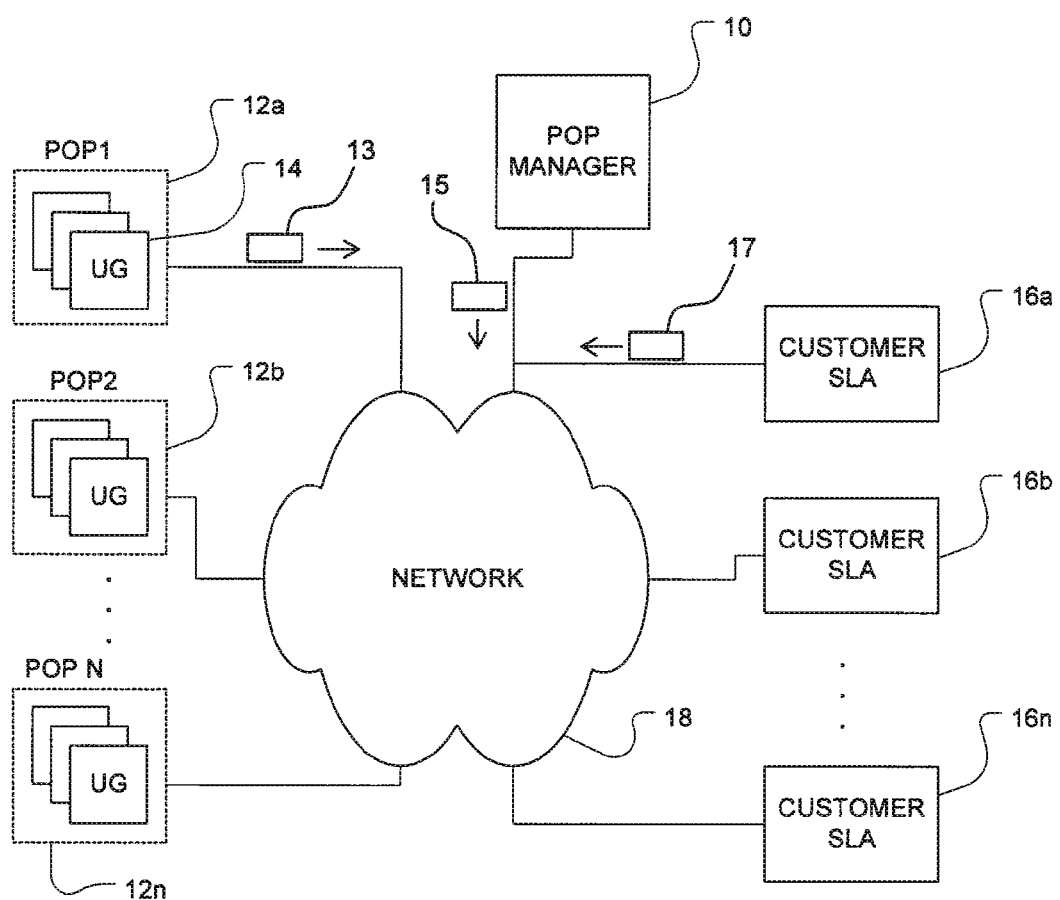
FIG. 1 shows an embodiment of a network including a network device operable to expedite port release, in accordance with the invention.

FIG. 1 shows an embodiment of a distributed network, in accordance with the invention. In the network, there is a set of points-of-presence (POP) 12a-12n. It is through these POPs that users access the network. The wholesale or distributed network includes the connection network 18, by which all of the components of the network communicate. The distributed network includes customer service level agreement servers (SLA) 16a-16n. These servers track and monitor the usage levels and traffic mixes for each customer that uses the wholesale network and ensure that the parameters of the customer SLAs are followed. These servers may be combined on one piece of equipment or may be distributed in such a way that each customer has a dedicated device.

In addition to the customer SLA management and enforcement, there will more than likely be POP management issues. For example, a particular POP has a predetermined number of ports. In distributed networks, sometimes there are delays in providing all of the various administrative devices the updated information. A gateway 14 located in POP 12a may receive accounting information related to one customer's use of a particular port on the POP. The gateway transmits that information to a customer SLA server 16*a* somewhere else in the network, which then records, or posts, the information indicating that the port is busy. At some point, that port is released and the updated information will be transmitted to the customer SLA 16*a*.

During the period of time between when the port is released and the SLA server 16*a* records the release, several call requests may be improperly rejected. This delay may increase with any buffering performed in the system. The port may actually be able to accept a new call or calls, but the system has outdated information and therefore rejects the calls that could actually be accepted. The accounting delays are typically a result of network access servers or universal gateways. Accounting data has historically been used for billing/accounting purposes. As long as it is accurate it typically does not matter if there are delays before the gateway sends out the termination messages after a session has terminated. In some instances, the same gateway may receive a call setup and accept that call even before it has sent out accounting information, often accounting information is buffered.

With the introduction of a server to manage the POPs, referred to here as POP manager 10, this problem may be overcome. In addition to administrating any POP-related policies such as how many ports on a particular POP a customer may have, the POP manager 10 may also be operable to expedite port release. Generally, the POP manager may operate to track and map call information with close to real-time synchronization.

Generally, the POP manager can utilize the fact that if a call setup request is received for a particular port, any information the POP manager has to the contrary is out of date. If a call setup request is received for a port, that port cannot have an active call, or the call setup request would not have been received. This can be understood more clearly within a particular architecture, such as the example shown in FIG. 1.

A call setup request is received by the universal gateway 14 within POP 12*a*. The universal gateway sends the call setup request 13 to the POP manager at 10, through the network 18. The call setup request 13 is also transmitted to the customer SLA server, for this particular example, the SLA server 16*a* will be assumed. The customer SLA accepts the call and sends the call acceptance message 17 to both the POP manager 10 and the universal gateway.

The POP manager 10 maintains a list of active ports, which may also be referred to as the active port cache. The contents of this cache will be discussed in more detail with reference to FIG. 3. When the POP manager receives the call acceptance message from the customer SLA server, it updates the active port cache to reflect the new information that the customer now occupies the port on gateway 14 within POP 12*a*.

The above scenario assumes that the port is not currently active and available to accept the call setup request. Due to the delays possible in the system, as discussed previously, the port may actually become free prior to the active port cache showing that the port is unoccupied. For purposes of this discussion, the listing in the active port cache showing that a port is busy will be referred to as it being occupied. This is to be differentiated from it being free. If a port is 'free' it means that it is available to receive calls. If a port is 'occupied' it may actually be free to receive calls, but the system information with regard to that port shows that it is not free.

In this example, the port is free but listed as occupied. However, when the POP manager receives a call setup request for that particular port, it determines that the call state for that port is active. Since the port cannot receive a call setup request if it is actually active, the POP manager transmits a release 15 to the relevant customer SLA. This occurs much more quickly and closer to real-time than waiting for the system to record the port usage and release through the customer SLA server and its accounting system.

Figure 2:
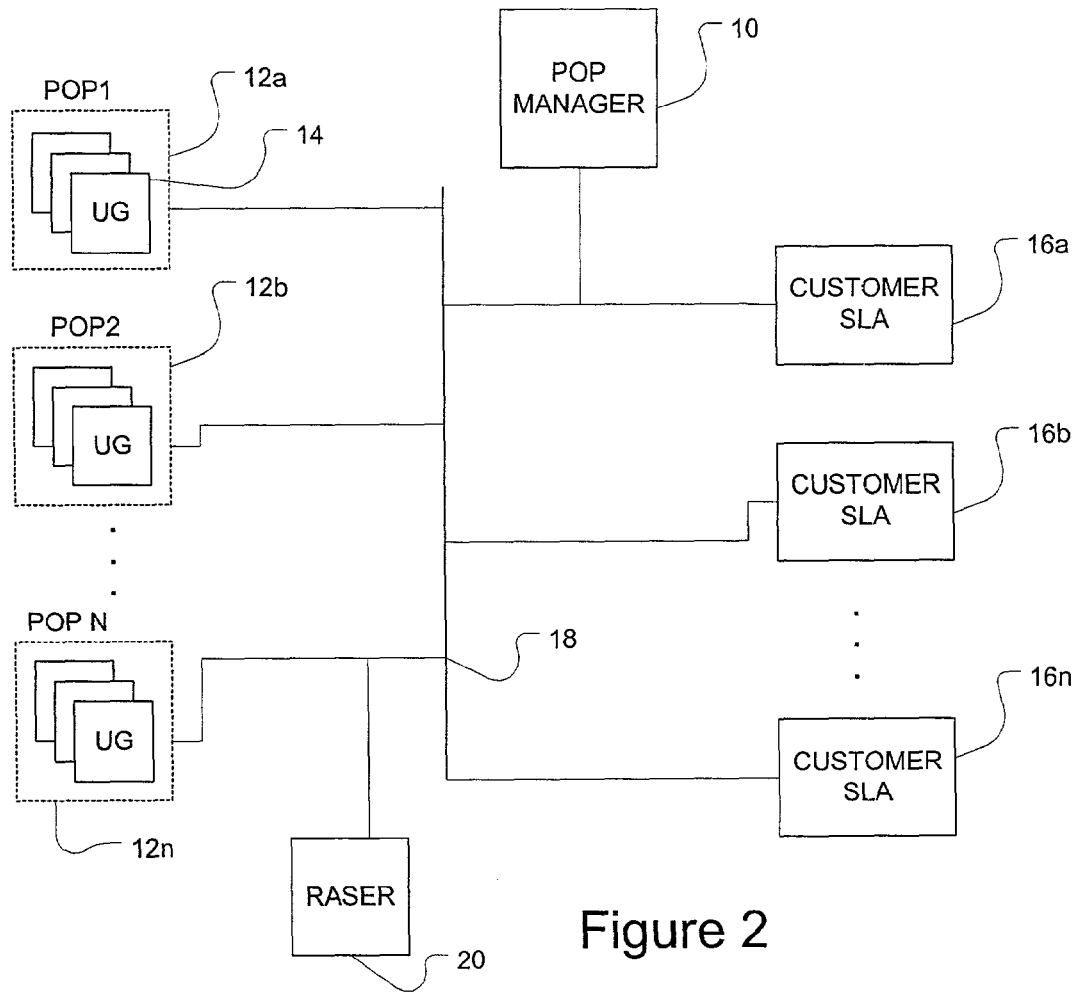
FIG. 2 shows an alternative embodiment of a network including a network device operable to expedite port release, in accordance with the invention.

The network architecture shown in FIG. 1 is just one example of an architecture within which this POP manager may function. In another embodiment, a different type of network device exists, called a Remote Authentication, Authorization and Accounting (AAA) SERvice device (RASER) 20. The EASER 20 is a network device that accepts and routes all type of administrative data to the appropriate administrative server. For example, in the architecture of FIG. 2, the universal gateway is not burdened with determining to which customer SLA to route the call setup request, or having to transmit the information to the POP manager.

In the above example, the universal gateway 14 within POP 12*a* sends the call setup request to the RASER 20. The RASER then notifies the POP manager 10 of the call setup request from any universal gateway managed by the POP manager 10. More than one POP manager may exist, to allow scalability of the network. The RASER 20 would just need to be updated as POP managers are added or removed from the network. If the POP manager 10 then determines that the state of the port for which the current call setup request is received is active, the POP manager would then transmit a release message back to the entity shown as occupying the port through the RASER. The entity shown as occupying the port, even though the port is actually free, will be referred to here as the occupying entity.

In this manner, the network maintains a close to real-time synchronization between all of its administrative servers. When the release message is sent, the accounting system can update itself to reflect the new information, as well as ensure closer tracking of customer SLAs. For example, calls may enter the system at 1000 calls/second. The necessary records to release ports may be delayed by tens of seconds. There may be hundreds of call received that could have been granted that were not, because the system 'believes' there to be active calls using ports that are actually free.

The POP manager that provides this synchronization may be a dedicated network device of any type, or it may be a set of instructions running on a network device already present in the system. Similar to the distribution or centralization of the customer SLA servers discussed above, the POP manager 10 may be a dedicated network device or reside on a network device with a number of customer SLA servers. Further, the term server as used here does not indicate a physical server as would be understood in the computing environment. A server may be any network device that provides the network service indicated.

Figure 3:
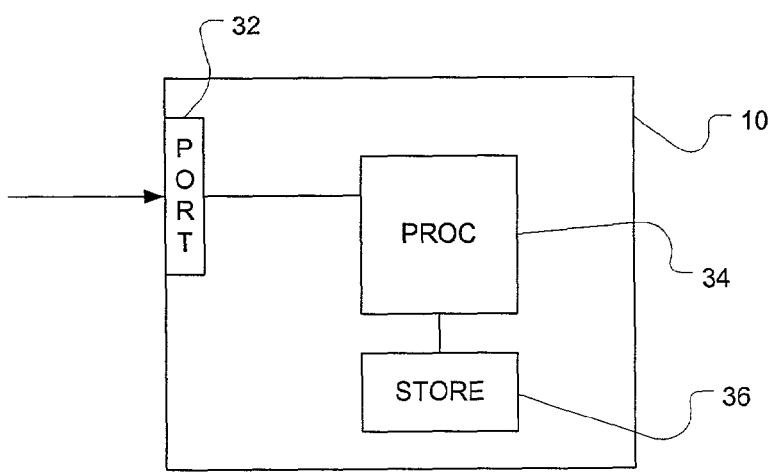
FIG. 3 shows an embodiment of a network device operable to expedite port release, in accordance with the invention.

An example of a POP manager as a dedicated network device is shown in FIG. 3. The POP manager 10 includes a port 32 through which is received the call setup request transmitted to it across the network. A processor 34 then receives the request, identifies the port for which the request is received and accesses a store 36. The store 36 contains the list of active ports, or the active port cache. The processor 34 then determines the current state for that port. If the port is listed as being active, the processor 34 then generates and transmits a release message to the occupying entity. Again, it must be noted that the occupying entity is not actually occupying the port; the system just reflects that it was occupied.

In an alternative embodiment, as mentioned above, the POP manager may comprise a set of instructions running on a network device. The machine-readable instructions are contained on an article and the instructions, when executed, cause the machine to execute the processes of the POP manager.

Thus, although there has been described to this point a particular embodiment for a method and apparatus for expedited port release, it is not intended that such specific references be considered as limitations upon the scope of this invention except in-so-far as set forth in the following claims.

What is claimed is:

1. A method to release ports, comprising:
    receiving a call setup request for a port from a universal gateway in a point of presence (POP);
    determining if the port is listed as active by accessing a local store;
    if the port is listed as active, transmitting a release message to a customer service level agreement server occupying the port;
    updating status information for the port; and
    receiving a call acceptance message.

2. The method of claim 1, the method comprising granting the call setup request after transmitting the release message.

3. The method of claim 2, the method comprising updating the local store to reflect the granting of the call setup request.

4. The method of claim 1, receiving the call setup request comprising receiving the call setup request from the universal gateway through a RASER.

5. The method of claim 1, transmitting the release message to the customer service level agreement server further comprises transmitting the release message to the customer service level agreement server through a RASER.

6. The method of claim 1, the method comprising updating the local store to reflect the release of the port.

7. A network device, comprising:
    an input port to receive a call setup request for a port from a universal gateway in a point of presence (POP);
    a storage to store a list of active ports;
    a processor operable to:
        determine if the port is included in the list of active ports;
        transmit a release message to a customer service level agreement server if the port is included in the list of active ports; and
        receive a call acceptance message.

8. The network device of claim 7, wherein the processor is also operable to accept the call setup request for the port.

9. The network device of claim 8, wherein the processor is also operable to update the list of active ports.

10. The network device of claim 7, wherein the processor is operable to transmit the release message to the customer service level agreement server through a RASER.

11. An article containing machine-readable code that, when executed, causes the machine to:
    receive a call setup request for a port from a universal gateway in a point of presence (POP);
    determine if the port is listed as active by accessing a local store;
    transmit a release message to a customer service level agreement server occupying the port if the port is listed as active;
    update status information for the port; and
    receive a call acceptance message.

12. The article of claim 11, wherein the code, when executed, further causes the machine to grant the call setup request.

13. The article of claim 12, wherein the code, when executed, further causes the machine to update the local store to reflect the granting of the call setup request.

14. The article of claim 11, wherein the code, when executed, causes the machine to receive the call setup request from the universal gateway through a RASER.

15. The article of claim 11, wherein the code, when executed, causes the machine to transmit the release message to the customer service level agreement server through a RASER.

16. The article of claim 11, wherein the code, when executed, causes the machine to update the local store to reflect the release of the port.

* * * * *